Figure 1:
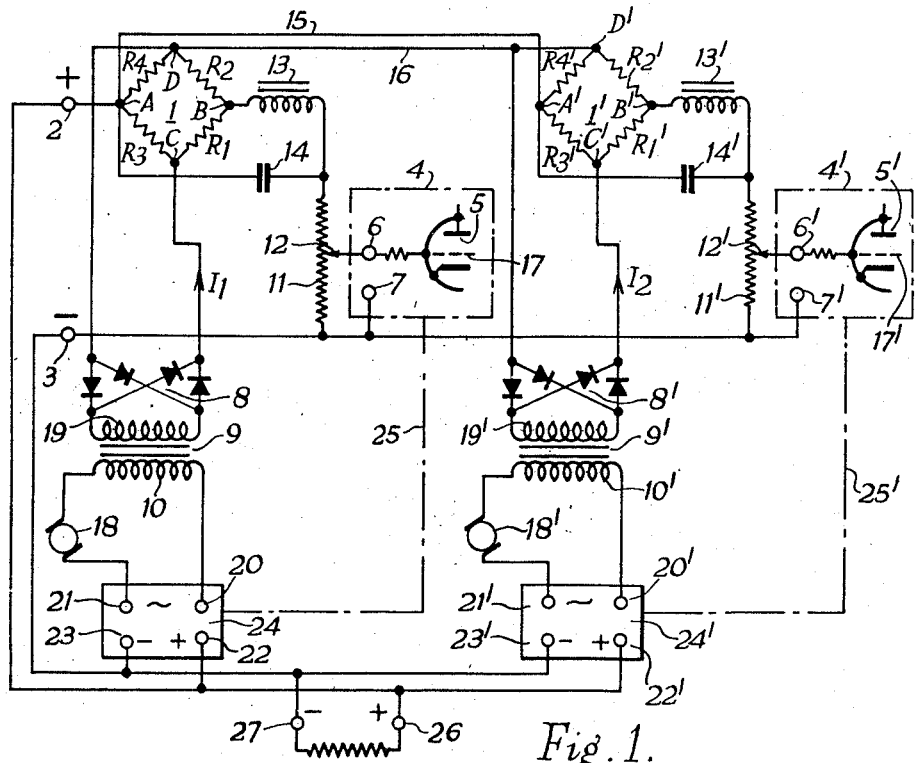

May 13, 1958

R. G. MARTIN 2,834,892

APPARATUS FOR THE REGULATION OF THE VOLTAGE ACROSS A COMMON
LOAD CIRCUIT SUPPLIED FROM TWO OR MORE
SOURCES OF DIRECT CURRENT

Filed March 3, 1954

United States Patent Office 2,834,892
Patented May 13, 1958

2,834,892

APPARATUS FOR THE REGULATION OF THE VOLTAGE ACROSS A COMMON LOAD CIRCUIT SUPPLIED FROM TWO OR MORE SOURCES OF DIRECT CURRENT

Raymond Gerald Martin, King's Cross, London, England, assignor to Westinghouse Brake and Signal Company Limited, London, England Application March 3, 1954, Serial No. 413,889

Claims priority, application Great Britain March 31, 1953

6 Claims. (Cl. 307—52)

This invention relates to apparatus for the regulation of the voltage across a common load circuit supplied from two or more sources of direct current and has for its object the provision of means for the automatic sharing of the load current by each of the sources in proportion to their full load rated outputs.

When a number of voltage regulated sources, such, for example, as rectifier sets deriving the direct current supplied to the load circuit from an alternating current source, are connected in parallel to a common load circuit, it is likely that, although regulated to the same normal output voltage, they will tend to operate at slightly different voltages within the limited range permitted by the voltage regulating apparatus. This inequality of output voltages gives rise to inequality in the proportions of the load supplied by the sources, those having the higher voltage output attempting to supply the entire load current.

Voltage regulating apparatus comprising means for automatically adjusting the voltage to be regulated in accordance with the magnitude of a direct current potential applied to said means is known.

According to the invention, apparatus for the regulation of the voltage across a common load circuit supplied simultaneously from two or more parallel connected sources of direct current comprises, in combination, associated with each source, voltage regulating means having input terminals and arranged to regulate the output voltage of its associated source in accordance with a direct current potential applied across said input terminals; means for deriving a first direct current potential proportional to the voltage across said load circuit; a resistance bridge having a first and a second pair of diametrically opposite points; means for supplying to said first pair of diametrically opposite points a direct current proportional to the direct current supplied to the load circuit by said source and means for applying to said input terminals a voltage dependent upon the sum of said first direct current potential and a second direct current potential appearing across said second pair of diametrically opposite points, a corresponding point of each said other pair of diametrically opposite points being connected to a common interconnection, all bridge arms having one end connected to said common interconnection having equal resistances and all other bridge arms also having equal resistances.

Figure 2:
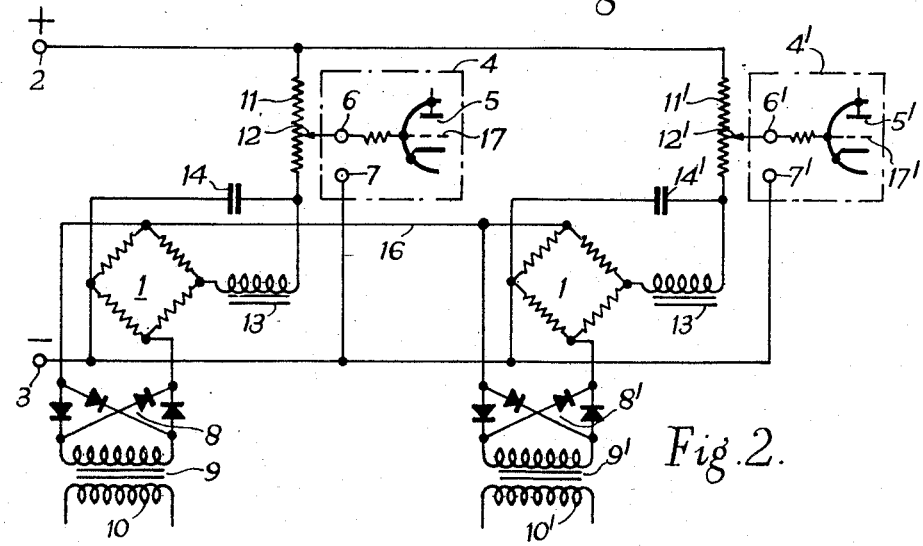

The invention is illustrated by way of example in the accompanying drawing, of which:

Figure 1 illustrates the invention as applied to the regulation of two sources of direct current; and Figure 2 shows a modification of part of the circuit shown in Figure 1.

In Figure 1 the reference numerals 24 and 24' represent two rectifier sets the output voltages of which are controllable and which constitute the two sources of direct current. The rectifier set 24 has alternating current input terminals 20 and 21 and positive and negative direct current output terminals 22 and 23 respectively: rectifier set 24' has alternating current input terminals 20' and 21' and positive and negative direct current output terminals 22' and 23'. The rectifier sets are connected in parallel on the direct current side to a common load 28. The positive and negative terminals 26, 27 of the load are respectively connected to the positive control terminal 2 and the negative control terminal 3. Alternatively, a voltage proportional to the voltage across the load 28 may be applied to terminals 2, 3. The rectifier set 24 is supplied from an alternating current source 18, the terminal 20 being connected to one terminal of the alternating current source through the primary winding 10 of a current transformer 9. The rectifier set 24' is supplied from an alternating current source 18', the terminal 20' being connected to one terminal of the alternating current source through the primary winding 10' of a current transformer 9'. Reference numerals 4, 4' indicate voltage regulating means controlling the output voltages of the associated rectifier set 24, 24' in accordance with the direct potential applied to input terminals 6, 7 and 6', 7' respectively, this control being indicated by the dotted lines 25, 25' respectively. The regulating means may be of any suitable type but preferably each comprises a double triode thermionic valve 5, 5', a control grid 17, 17' of which is connected to input terminal 6, 6'. The regulating means forms no part of the present invention and it is accordingly considered not to be necessary to describe its action other than to point out that it adjusts the output voltage of the rectifier set with which it is associated in accordance with the variations of the potential of the control grid 17, 17'.

Connected in series across terminals 2, 3 are resistance bridge 1 and a potentiometer 11. A tapping point 12 on the potentiometer is connected to positive input terminal 6 of the regulating means 4. Also connected in series across terminals 2, 3 are resistance bridge 1' and a potentiometer 11', a tapping point 12' of which is connected to positive input terminal 6' of regulating means 4'. The negative input terminals 7, 7' of the regulating means 4, 4' are each connected to the negative terminal 3. The two resistance bridges 1, 1' are identical and are composed of four resistors R1, R2, R3, R4 and R1', R2', R3', R4' respectively, the resistors R1, R2, R1' and R2' being of equal value and the resistors R3, R4, R3' and R4' also being of equal value. All the resistors may conveniently be of equal value.

To point C, C' of the resistance bridges are fed direct currents $I_1$, $I_2$ proportional to the current supplied to the load circuit by the associated rectifier set. These currents are derived from the auxiliary full wave rectifiers 8, 8' which are supplied with current from the secondary windings 19, 19' of the current transformers 9 and 9' respectively. Points A, A' of the bridges 1, 1' are connected together by a common conductor 15 and points D, D' are connected together by a common conductor 16. Inductive reactors 13, 13' and condensers 14, 14' are required only if it is necessary to reduce the ripple in the input to the regulating means 4, 4'.

Currents $I_1$ and $I_2$ are so adjusted, by suitable adjustment of the turns ratios of the current transformers, as to be equal when the total load is shared between the two rectifier sets in proportion to their full load rated outputs and under these conditions there is no potential drop across diagonals A—B and A'—B' of the bridges due to the currents $I_1$, $I_2$. Consequently, the potential drops across diagonals A—B and A'—B' are independent of currents $I_1$ and $I_2$ so long as they remain in these proportions, and the potential across input terminals 6, 7 and 6', 7' is dependent only upon the output voltage appearing across terminals 2, 3 and the setting of the potentiometer tapping point 12, so that the output voltage of each rectifier set is automatically maintained at the correct regulated value, within a small permitted range of variation.

If now the rectifier set associated with the regulating means 4 attempts to supply more than its due proportion of the load current, current $I_1$ will be larger than $I_2$. This unbalancing of the bridge network will cause potentials to be produced across points A—B and A'—B' of the two bridges, that of bridge 1 being of such a polarity as to increase the potential across potentiometer 11, and that of bridge 1' being of such a polarity as to decrease the potential across potentiometer 11' by the same amount. Consequently the potential of terminal 6 relative to that of terminal 7 will be increased and that of terminal 6' relative to that of terminal 7' will be decreased, resulting in a corresponding decrease and increase in the output voltages of the two rectifier sets respectively and thus in an adjustment of the load currents supplied by them until those currents are again in the correct proportion. The potentiometers 11, 11' are theoretically required only when the voltage applied across terminals 2, 3 is too great to be applied directly to the input terminals 6, 7 and 6', 7' of the regulating means 4, 4' although in practice they are desirable for the purpose of adjustment in all cases. The actual potential across these input terminals will depend upon the position of the tapping points 12, 12' and the greater the voltage across terminals 2, 3 the nearer to the negative ends of the potentiometers will these tapping points approach and the greater will be the potential drop between terminal 2 and points 12, 12' on the potentiometers. The potential across points A—B, A'—B' produced by a given out-of-balance current flowing in the bridge network is not dependent upon the setting of tapping points 12, 12' and accordingly makes a lower contribution to the potential drop between tapping points 12, 12' and the negative terminal 3 the nearer the points 12, 12' approach the negative ends of potentiometers 11, 11'. Thus the effect of any potential produced across points A—B and A'—B' upon the potential of terminal 6 relative to terminal 7 and of terminal 6' relative to terminal 7' is dependent upon the setting of the tapping points 12, 12' becoming less the nearer these tapping points approach the negative end of their respective potentiometer. That is to say the sensitivity of the apparatus to changes in the proportion of load current supplied from each source is the higher the lower the potential drop between terminals 2 and tapping points 12, 12'.

If more than two sources are employed the resistance bridges associated with the additional sources are similarly arranged, one common connection joining the points A, A' to points on each additional resistance bridge corresponding to the points A, A' and another joining the points D, D' to points on each additional resistance bridge corresponding to the points D, D'.

For settings of the tapping points 12, 12', such that the potential drop between positive terminal 2 and those points exceeds that between those points and negative terminal 3, an increase in the above mentioned sensitivity may be obtained by connecting the resistance bridges on the negative sides of the potentiometers, as illustrated in Figure 2, the values of the resistors making up the bridges remaining unchanged. With this arrangement, the potential drop between points 12, 12' and terminal 3 being less than that between terminal 2 and points 12, 12' any change brought about in the potential of points 12, 12' relative to terminal 7 by a change in potential across the resistance bridges due to a change in current loading, will be a greater percentage change than would be the case with the arrangement of Figure 1 under similar conditions of potentiometer setting, that is to say the sensitivity of the apparatus to changes in potential across the resistance bridges is greater.

If desired, the two resistance bridges may be energised from voltage sources the magnitudes of which vary in proportion to the load currents supplied by the several parallel connected power sources, instead of the current sources illustrated in Figures 1 and 2, in which case it may be found desirable to make resistors R1, R3, R1' and R3' a different resistance from that of R2, R4, R2' and R4' to meet certain desired conditions appertaining to the control of the regulating means 4, 4'. For example, greater sensitivity is obtained, under such conditions when R1 is less than R2, but against this must be balanced the fact that, for a given total bridge resistance, the more unequal R1 and R2 are, the greater will be the power taken from the voltage source.

Having thus described my invention, what I claim is:

1. Apparatus for the regulation of the voltage across a common load circuit supplied simultaneously from two or more parallel connected sources of direct current comprising, in combination, associated with each source, voltage regulating means having input terminals and arranged to regulate the output voltage of its associated source in accordance with a direct current potential applied across said input terminals; means for deriving a first direct current potential proportional to the voltage across said load circuit, a resistance bridge having a first and a second pair of diametrically opposite points, means for supplying to said first pair of diametrically opposite points a direct current proportional to the direct current supplied to the load circuit by said source and means for applying to said input terminals a voltage dependent upon the sum of said first direct current potential and a second direct current potential appearing across said second pair of diametrically opposite points, a corresponding point of each other pair of diametrically opposite points being connected to a common interconnection, all bridge arms having one end connected to said common interconnection having equal resistances and all other bridge arms also having equal resistances.

2. Apparatus as claimed in claim 1 in which all bridge arms have equal resistances.

3. Apparatus for the regulation of the voltage across a common load circuit supplied simultaneously from two or more parallel connected sources of direct current comprising, in combination, a plurality of voltage regulating means, one associated with each of said sources respectively, having input terminals and each arranged to regulate the output voltage of its associated source in accordance with a direct current potential applied across its input terminals; two control terminals having a direct current potential applied thereto derived from the voltage across said load circuit; a plurality of resistance bridges one associated with each of said sources and having feed points and output points; a plurality of potentiometers one associated with each of said sources; a plurality of series circuits each connecting the output points of one of said resistance bridges and its associated potentiometer across said control terminals; means connected to the input points of each resistance bridge for passing therethrough a direct current proportional to the current supplied by its associated source to the load circuit; means connecting said input terminals of said voltage regulating means across at least part of its associated potentiometer; a corresponding point of each said other pair of diametrically opposite points being connected to a common interconnection, all bridge arms having one end connected to said common interconnection having equal resistances and all other bridge arms also having equal resistances.

4. Apparatus as claimed in claim 3 in which all bridge arms have equal resistances.

5. Apparatus for the regulation of the voltage across a common load circuit supplied with direct current from a plurality of parallel connected rectifier units each deriving energy from a source of alternating current, comprising, in combination, a plurality of voltage regulating means, one associated with each of said rectifier units respectively, having input terminals and each arranged to regulate the output voltage of its associated rectifier unit in accordance with a direct current potential applied across its input terminals; a pair of control terminals having a direct current potential across them derived from the voltage across the load circuit; a plurality of resistance bridges each composed of four resistors of equal magnitude and having two pairs of diagonally disposed points of connection between said resistors, one of said bridges being associated with each of said rectifier units respectively; a plurality of potentiometers, one associated with each of said rectifier units respectively, each connected across said control terminals in series with one of said pairs of points of connection of its associated bridge, in parallel with the similarly series connected bridge and potentiometer associated with each of the other rectifier units; a tapping on each of said potentiometers each connected to one of said input terminals of its associated regulating means respectively; a first common connection connecting together the other of said input terminals of all said regulating means and one of said control terminals; a plurality of current transformers, one associated with each of said rectifier units respectively, the output of each of which is proportional to the alternating current supplied to its associated rectifier unit; a plurality of auxiliary rectifiers, one connected between the output of each of said current transformers respectively and the other of said pairs of points of connection of the associated bridge, whereby a rectified current proportional to the current supplied to the load by the associated rectifier unit is fed into said bridge; and a second common connection connecting together one of said other pair of points of connection on each of said bridges all bridge arms having one end connected to the second common connection having equal resistances and all the other arms having equal resistances.

6. Apparatus as claimed in claim 5 in which all bridge arms have equal resistances.

References Cited in the file of this patent

UNITED STATES PATENTS

| | | |
|---|---|---|
| Re. 20,548 | Doyle | Nov. 9, 1937 |
| 1,086,300 | Kraus | Feb. 3, 1914 |
| 1,103,018 | Ferguson | July 7, 1914 |
| 1,918,021 | Doyle | July 11, 1933 |
| 1,985,081 | Doyle | Dec. 18, 1934 |